United States Patent [19]

Kurihara et al.

[11] Patent Number: 4,765,450
[45] Date of Patent: Aug. 23, 1988

[54] CLUTCH CONTROL APPARATUS RESPONSIVE TO MOTOR AND GEARING CONTROLS

[75] Inventors: Kazumasa Kurihara; Kenji Arai, both of Higashimatsuyama, Japan

[73] Assignee: Diesel Kiki Co., Ltd., Tokyo, Japan

[21] Appl. No.: 922,226

[22] Filed: Oct. 23, 1986

[30] Foreign Application Priority Data

Oct. 30, 1985 [JP] Japan .................. 60-243413

[51] Int. Cl.$^4$ ............................................. B60K 41/28
[52] U.S. Cl. .............................. 192/0.052; 192/0.076; 192/0.092; 192/3.58; 192/3.62
[58] Field of Search ................. 192/0.052, 0.092, 0.04, 192/0.032, 3.58, 3.62, 0.073, 0.075, 0.076, 103 R

[56] References Cited

U.S. PATENT DOCUMENTS

| | | | |
|---|---|---|---|
| 4,518,068 | 5/1985 | Oguma et al. | 192/0.052 |
| 4,615,425 | 10/1986 | Kobayashi et al. | 192/0.076 |
| 4,618,043 | 10/1986 | Hattori et al. | 192/0.076 X |
| 4,632,231 | 12/1986 | Hattori et al. | 192/103 R X |
| 4,645,045 | 2/1987 | Takefuta | 192/3.62 |
| 4,714,145 | 12/1987 | Kurihara et al. | 192/0.052 |

FOREIGN PATENT DOCUMENTS 60-11756 1/1985 Japan .
60-75735 4/1985 Japan .

Primary Examiner—Rodney H. Bonck
Attorney, Agent, or Firm—Pollock, Vande Sande & Priddy

[57] ABSTRACT

In an apparatus for controlling a vehicle clutch which is located between an internal combustion engine and a transmission device whose gear shift position is determined in accordance with the operating position selected by a selector, the apparatus comprises a control signal generator which determines the operating pattern for engaging the clutch in response to at least a position signal showing an operating position selected by the selector and produces a control signal for operating the clutch according to the determined operating pattern in response to the output of a command signal for commanding the beginning of the starting of the vehicle. Thus, the clutch is engaged in accordance with an engaging pattern corresponding to the selected operating position of the selector at that time in response to the output of the command signal.

12 Claims, 4 Drawing Sheets

CLUTCH CONTROL APPARATUS RESPONSIVE TO MOTOR AND GEARING CONTROLS

BACKGROUND OF THE INVENTION

The present invention relates to an apparatus for controlling a clutch, more particularly to an apparatus for controlling a clutch of a vehicle which is capable of carrying out the clutch engaging operation for the vehicle smoothly.

In the case where, for example, an automatic transmission system including a gear-type transmission with an actuator by which the operation for changing the gear of the transmission can be carried out in response to an electrical signal supplied from outside, a clutch control system for operating a clutch in accordance with an electrical signal becomes necessary. Incidentally, the greatest problem which arises in this case is concerned with the engaging operation of the clutch at the time of the starting of the vehicle. That is, a semi-engaging operation of the clutch is usually required at the time when the operation for starting a vehicle is carried out using one of the two methods of either changing the slip rate by a predetermined rate from 1 to 0 in correspondence with the passage of time from the beginning of the starting of a vehicle or changing the slip rate by controlling the operating position of the clutch. In either of these two cases, the clutch engaging operation is carried out in accordance with a predetermined pattern of the operation.

However, the conditions at the time of the starting of a vehicle are diverse, such as when starting on a slope or on a snow-covered track. Therefore, there is the disadvantage of not being able to expect to regularly maintain a smooth, and moreover reliable starting of the vehicle when the clutch engaging operation is performed on the basis of only the single operating pattern for engaging the clutch.

SUMMARY OF THE INVENTION

It is therefore an object of the present invention to provide an improved apparatus for controlling a clutch of a vehicle.

It is another object of the present invention to provide a clutch control apparatus which is capable of controlling the engaging operation of a clutch for the starting of a vehicle smoothly in correspondence to the condition in which the vehicle is started at that time.

According to the present invention, in an apparatus for controlling a clutch of a vehicle which is located between an internal combustion engine and a transmission device whose gear shift position is determined in accordance with the operating position selected by a selector, the apparatus comprises an actuating means for actuating the clutch in accordance with an electric signal from outside, means for producing a position signal indicating the operating position selected by the selector at each instant, a first means for generating a command signal for commanding the beginning of the starting of the vehicle powered by the internal combustion engine, and a second means for determining the operating pattern for engaging the clutch in response to at least the position signal and supplying the actuating means with a control signal for operating the clutch according to the determined operating pattern in response to the output of the command signal.

When a desired operating position of the selector is selected, the operating pattern for engaging the clutch is determined in the second means in accordance with at least the position signal showing the selected operating position of the selector at each instant. The control signal for carrying out the engaging operation of the clutch in accordance with the determined operating pattern is generated from the second means and applied to the actuating means in response to the output of the command signal for commanding the beginning of the starting of the vehicle. As a result, the clutch is engaged in accordance with an engaging pattern corresponding to the selected operating position of the selector at that time in response to the output of the command signal.

The invention will be better understood and other objects and advantages thereof will be more apparent from the following detailed description of preferred embodiments with reference to the accompanying drawings.

DESCRIPTION OF THE PREFERRED EMBODIMENTS

Figure 1:
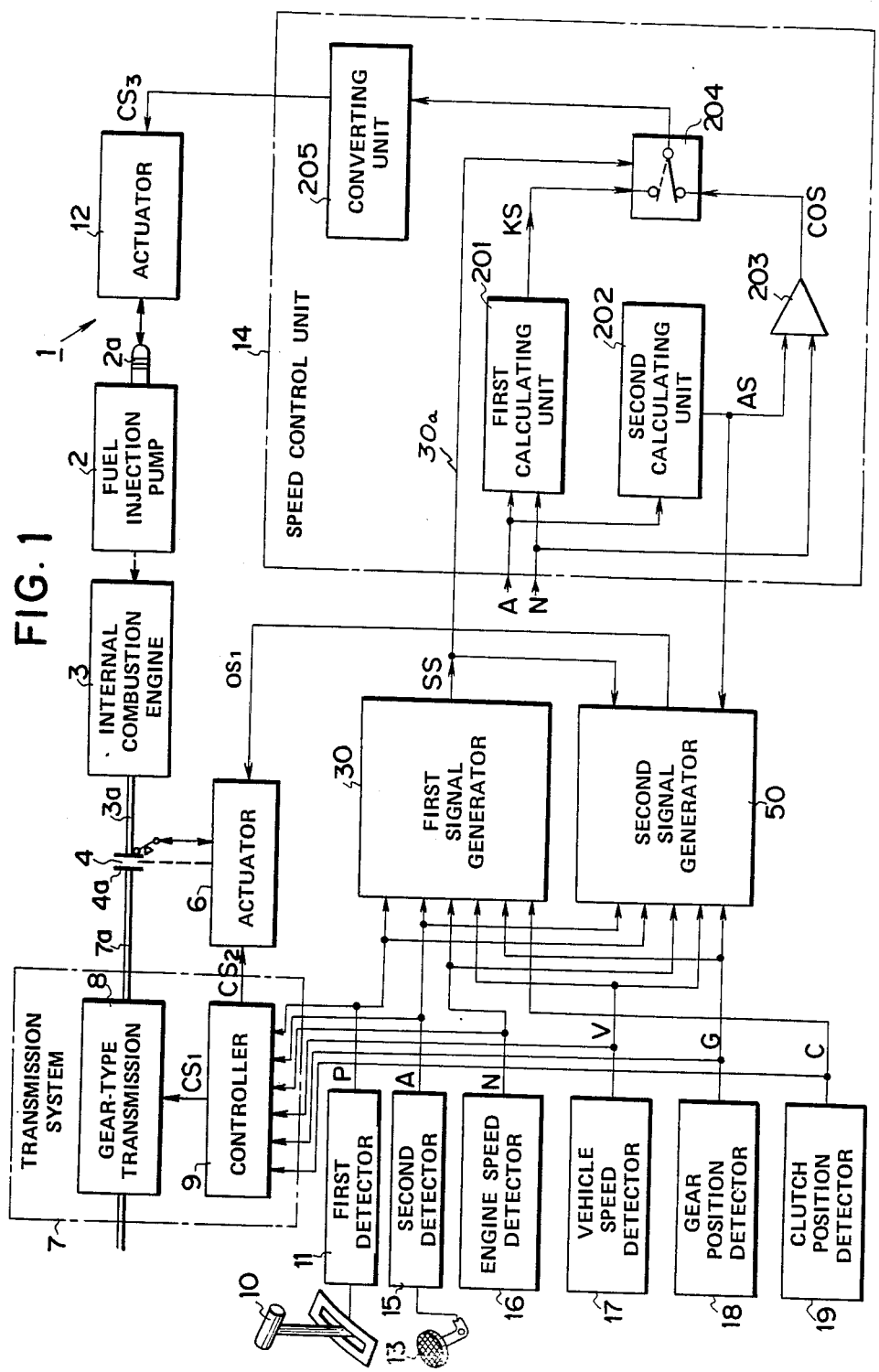
FIG. 1 is a block diagram of an embodiment of an apparatus for controlling a clutch of a vehicle according to the present invention.

FIG. 1 is a block diagram showing an embodiment of a clutch control apparatus for a vehicle according to the present invention. A clutch control apparatus 1 is provided for controlling the operation for engaging a clutch at the time of the start of a vehicle (not shown) powered by an internal combustion engine 3 to which fuel is supplied from a fuel injection pump 2. The clutch 4 is a friction clutch located between an output shaft $3_a$ of the internal combustion engine 3 and an input shaft $7_a$ of a transmission system 7, and an actuator 6, for operating the clutch 4 in response to an electric signal provided from an outside source, is coupled with the clutch 4.

The transmission system 7 comprises a geartype transmission 8 set with an actuator (not shown) for carrying out necessary gear-shifting operation, and a controller 9 which produces first and second control signals $CS_1$ and $CS_2$ for controlling the geartype transmission 8 and the actuator 6 coupled with the clutch 4, respectively. The transmission system 7 receives a position signal P from the first detector 11. The position signal P produced by the first detector 11 shows the operating position selected by a selector 10 at each instant. Furthermore, the transmission system 7 is input with an acceleration signal A showing the amount of operation of an accelerator pedal 13, an engine speed signal N showing the engine speed of the internal combustion engine 3 at each instant, a vehicle speed signal V showing the vehicle speed at each instant, a gear position signal G showing the actual gear position of the gear-type transmission 8 at each instant, and a clutch signal C showing the position of the clutch disc $4_a$ of the clutch 4. These signals are produced by a second detector 15 connected to the accelerator pedal 13, an engine speed detector 16, a vehicle speed detector 17, a gear position detector 18 and a clutch position detector 19, respectively. The controller 9 outputs the first and second control signals $CS_1$ and $CS_2$ necessary for changing the gear of the gear-type transmission 8 in response to the above input signals. This type of transmission system is widely known so that a detailed description will be omitted. In this embodiment, an arrangement is shown in which the transmission system 7 operates in response to the position signal P. However, the invention is not limited to this embodiment and the constitution of the transmission system 7 may take a different form as long as it operates in response to at least the operation of the selector 10.

An actuator 12 is connected to a rack $2_a$ for regulating the amount of fuel supplied from the fuel injection pump 2 to the internal combustion engine 3 and is operated in response to a third control signal $CS_3$ supplied from a speed control unit 14 to regulate the position of the rack $2_a$ in accordance with the amount of depression of the accelerator pedal 13 and the speed of the internal combustion engine 3.

The speed control unit 14 is provided a first calculating unit 201 which produces a target position signal KS indicating the target rack position of the rack $2_a$ in accordance with the maximum-minimum speed governor characteristic in response to the acceleration signal A and the engine speed signal N, and a second calculating unit 202 which produces a target speed signal AS indicating the target engine speed of the engine 3 according to the all-speed governor characteristic in response to the acceleration signal A. The target speed signal AS is input to one input terminal of a comparator 203 having another input terminal to which the engine speed signal N is applied, and the comparator 203 outputs an output signal COS representing the difference between the target speed and the actual engine speed of the internal combustion engine 3.

The output signal COS and the target position signal KS are input to a selecting switch 204 which operates in response to a start command signal SS produced from a first signal generator 30, a description of which will be given later. The selecting switch 204 is operated so as to select the output signal COS when the level of the start command signal SS is high, and to select the target position signal KS when the level of the start command signal SS is low. The output from the selecting switch 204 is input to a converting unit 205 to convert it into a signal for driving the actuator 12, and a third control signal $CS_3$ for driving the actuator 12 is produced from the converting unit 205.

The clutch control apparatus 1 comprises the first signal generator 30 which discriminates whether or not the vehicle powered by the internal combustion engine 3 has assumed a condition where preparation for the starting of the vehicle has been completed and produces the start command signal SS when a condition in which the preparation for the starting of a vehicle is completed has been confirmed, and a second signal generator 50 which is responsive to the start command signal SS and produces a control signal $OS_1$ for actuating the actuator 6 in such a way that the clutch 4 is engaged by a semi-engaging operation corresponding to the operating position selected by the selector 10 at that time for starting the vehicle.

The first signal generator 30 receives the position signal P, the acceleration signal A, the engine speed signal N, the vehicle speed signal V, gear position signal G and the clutch signal C, and discriminates whether or not the vehicle has assumed a condition where preparation for the starting of the vehicle has been completed in accordance with a predetermined discrimination criteria. If it is discriminated that the preparation for starting the vehicle has been completed by the first signal generator 30, the start command signal SS is produced from the first signal generator 30 and the level of the output line $30_a$ becomes high. In this embodiment, the discrimination criteria in the first signal generator 30 are as follows:

(a) whether or not the accelerator pedal 13 is depressed (discriminated from the acceleration signal A).

(b) whether the rotational speed of the internal combustion engine 3 is greater than the idling rotational speed (discriminated from the engine speed signal N).

(c) whether the clutch is disengaged (discriminated from the clutch signal C).

(d) whether the gear position shown by the selector 10 coincides with the actual gear position (discriminated from the position signal P and the gear position signal G).

(e) whether the actual gear position is in a predetermined low gear position (reverse, first or second gear position) (discriminated from the gear position signal G).

(f) whether the vehicle speed is below a speed necessary for the semi-engaging operation of the clutch at the time of the starting of the vehicle in that gear position (discriminated from the actual gear position signal G and the vehicle speed signal V).

The start command signal SS is output only when the result of every discrimination from (a) to (f) mentioned above is YES. Furthermore, the discrimination criteria in (a) through (f) are just examples, and it is obvious that other criteria suitably corresponding to the different types of conditions instead of or in addition to the criteria mentioned can be used.

Figure 2:
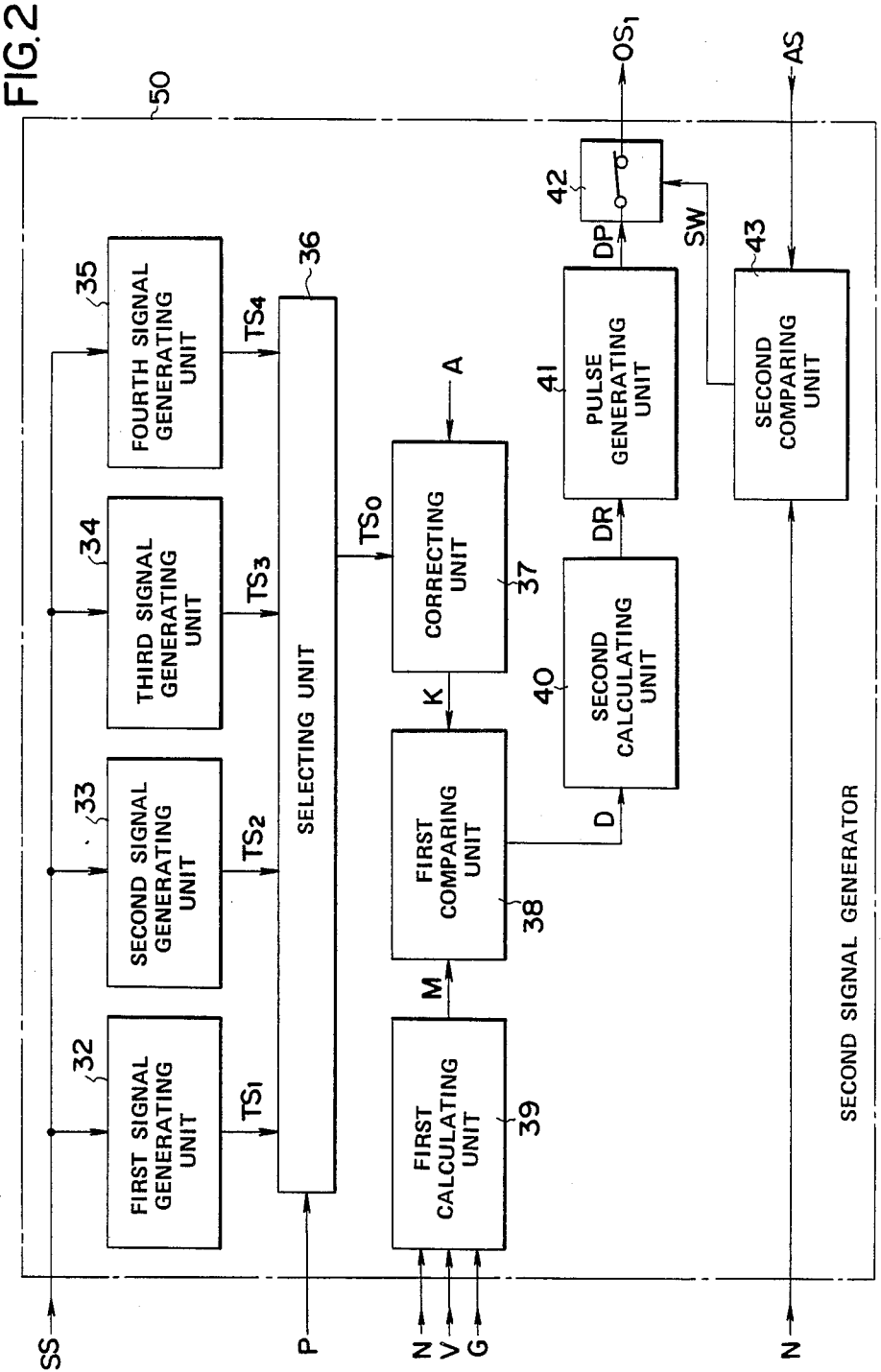
FIG. 2 is a detailed block diagram of a second signal generator shown in FIG. 1.
Figure 3A:
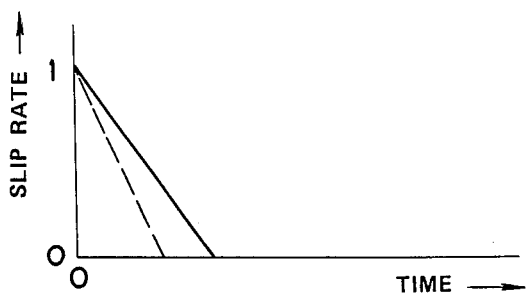
FIG. 3A through 3D are characteristic diagrams showing the individual characteristics corresponding to the pattern of the engaging operation of the clutch executed in the device shown in FIG. 1.
Figure 3B:
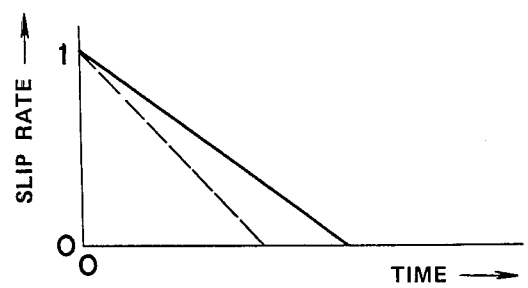
Figure 3C:
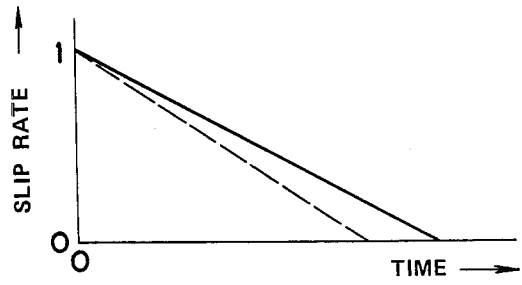
Figure 3D:
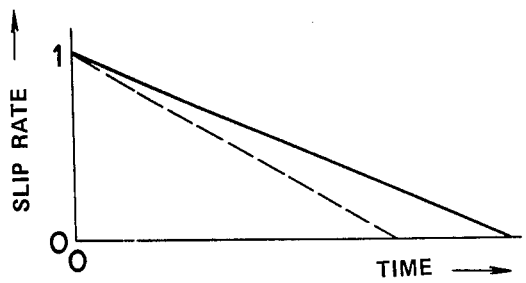

The constitution of the second signal generator 50 will now be described with reference to FIG. 2 in the following.

The second signal generator 50 has first to fourth signal generating units 32 to 35 which are responsive to the start command signal SS, and first to fourth target signals $TS_1$ to $TS_4$ are produced from these units 32 to 35 in response to the application of the start command signal SS. The first to fourth target signals $TS_1$ to $TS_4$ show the target slip rates of the clutch 4 at each instant after the start command signal SS is produced.

FIGS. 3A to 3D show each of the characteristics of the first through fourth target signals $TS_1$ through $TS_4$. In this embodiment, the first target signal TS indicates the target slip rate characteristic in the case where the drive (D) position is selected by the selector 10 while the second target signal $TS_2$ indicates the target slip rate characteristic when the second (2nd) position is selected by the selector 10. Further, the third target signal $TS_3$ indicates the target slip rate characteristic when the first (1st) position is selected by the selector 10, and the fourth target signal $TS_4$ indicates the target slip rate characteristic when the reverse (R) position is selected by the selector 10.

Moreover, the starting gear position for the first position is in the first speed gear position; the starting gear position for the second position is the second speed gear position; the starting gear position for the drive position is the second speed gear position; and the starting gear position for the reverse position is the reverse gear position. However, since the engaging characteristic of the clutch is different for each position of the selector 10, even when in the same starting gear position, starting of the vehicle suited to each position of the selector 10 can be carried out.

The first to fourth target signals $TS_1$ to $TS_4$ are input to a selecting unit 36 which operates in response to the position signal P. One of the signals corresponding to the operating position of the selector 10 indicated by the position signal P is selected as a target signal $TS_0$ by the selecting unit 36 and the target signal $TS_0$ is input to a correcting unit 37.

The correcting unit 37 is for correcting the target signal $TS_0$ selected as aforementioned in correspondence to the amount of depression of the accelerator pedal 13 at each instant. The correcting unit 37 is responsive to the acceleration signal A and corrects the characteristics as shown in the dotted lines in FIGS. 3A through 3D. That is, the characteristic curves shown by the solid lines in FIGS. 3A to 3D represent the characteristics when the amount of depression of the accelerator pedal 13 is at the least amount of depression for putting the vehicle into a condition in which its starting operation is controlled. When the amount of depression of the accelerator pedal 13 becomes any greater, the inclination of each characteristic is made much greater correspondingly, and the individual characteristics are corrected so that a much faster starting of the vehicle is possible corresponding to the amount of depression of the accelerator pedal 13.

The target signal $TS_0$ corrected by the correcting unit 37 is input to a first comparing unit 38 as a target slip rate signal K. The first comparing unit 38 receives an actual slip rate signal M showing the actual slip rate of the clutch 4 from the first calculating unit 39 in which the actual slip rate of the clutch 4 is calculated on the basis of a gear position signal G, a vehicle speed signal V and an engine speed signal N. A signal indicating the difference between the actual slip rate and the target slip rate is calculated in the first comparing unit 38 on the basis of both signals K and M, and output as a difference signal D from the first comparing unit 38.

When the actual slip rate is greater than the target slip rate, the difference signal D assumes a value with a positive sign whereas when the actual slip rate is less than the target slip rate, the difference signal D becomes a value having a negative sign. In order to determine the operating speed of the clutch 4, the difference signal D is applied to a second calculating unit 40, in which the operating speed of the clutch 4 corresponding to the value of the difference signal D is calculated. In this case, when the difference indicated by the difference signal D is a negative value, the operating speed of the clutch 4 is set to zero; that is, it is maintained at that operating position. A signal indicating the result of the calculation in the second calculating unit 40 is output as an operating speed signal DR, which is input to a pulse generating unit 41.

The pulse generating unit 41 outputs a driving pulse signal DP whose duty ratio is determined by the operating speed signal DR. The duty ratio of the driving pulse signal DP approaches 1 as the operating speed indicated by the operating speed signal DR increases, while on the other hand, the duty ratio becomes closer to zero as the speed of the operation slows down. This driving pulse signal DP is derived through a switch 42 and applied to the actuator 6 as the control signal $OS_1$.

The actuator 6 is of a widely known construction, having a hydraulic cylinder for operating the clutch 4. The actuator 6 has a valve for decreasing the pressure of the operating fluid inside the hydraulic cylinder and the valve is driven by the driving pulse signal DP or the control signal $OS_1$. The hydraulic cylinder is operated in such a way that the clutch 4 is engaged at a speed corresponding to the average degree of the opening of the valve. Therefore, the speed of the engaging operation of the clutch 4 can be regulated by controlling the duty ratio of the driving pulse signal DP and the clutch 4 can be maintained at a specific slip condition thereby.

There is provided a second comparing unit 43 for controlling the ON/OFF condition of the switch 42 in order to stop the engaging operation of the clutch 4 when the engine speed becomes lower than the predetermined target value calculated in the speed control unit 14 during the engaging operation of the clutch 4 whereby the internal combustion engine is prevented from stalling. The second comparing unit 43 receives the engine speed signal N and a target speed signal AS, and it is discriminated on the basis of the signals N and AS whether the actual rotational speed $N_a$ has decreased by more than a predetermined amount from a target rotational speed $N_t$. When the value of $N_t - N_a$ is greater than a predetermined value, the switch 42 is opened by a switch controlling output SW to terminate the engaging operation of the clutch 4.

With this constitution, when it is detected in the first signal generator 30 that the preparation for the starting of the vehicle has been completed and the start command signal SS is output, the first to fourth target signals $TS_1$ to $TS_4$ are output from the first through fourth signal generating units 32 through 35. Since one of these signals $TS_1$ to $TS_4$ is selected in the selecting unit 36 in accordance with the contents of the position signal P, a target signal representing a pattern corresponding, to the operating position of the selector 10 at that time is selected out of the four clutch engaging operation patterns shown in FIGS. 3A through 3D. As can be understood from FIGS. 3A-D, the individual patterns are set so that the clutch engaging period is long when the operating position of the selector 10 is in a low position such as first or reverse position while the clutch engaging period is short when the operating position of the selector 10 is in the second or drive position. As a result, it is possible to obtain a suitable semi-engaging operation of the clutch 4 for the position selected by the selector 10. In the correcting unit 37, a correction is made to the target signal $TS_0$ from the selecting unit 36 in accordance with the amount of depression of the accelerator pedal 13, whereby the target slip signal K indicating the final target slip rate is obtained.

Thus, the control of the slip rate of the clutch 4 is carried out in the closed-loop control mode by the use of the actual slip signal M and the target slip signal K showing the pattern for the clutch engaging operation corresponding to the operating position of the selector 10.

As a result, the engaging operation of the clutch 4 for starting the vehicle in this case is carried out in accordance with the pattern corresponding to the operating position of the selector 10 whereby it is possible to carry out the operation for starting the vehicle which reflects the intentions of the operator. Consequently, when the operator puts the selector 10 in the drive or second position for starting the vehicle on a steep slope, for example, the clutch engaging operation can be performed at a comparatively high speed and the vehicle can be started on a slope smoothly. Meanwhile, when the operator requires a slow starting of the vehicle in the first position for starting the vehicle, for example, on a road covered in snow, the engaging speed of the clutch likewise becomes slow so that a safe starting of the vehicle can be expected. Furthermore, when the rotational speed of the internal combustion engine 3 has become less than the target value during the engaging operation of the clutch 4, a switch 42 is controlled so as to be opened by the second comparing unit 43, the engaging operation of the clutch 4 is suspended, and the occurrence of engine stalling during the engaging operation of the clutch 4 is effectively prevented. FIGS. 3A-D show only examples of the characteristics of the apparatus according to the present invention; the characteristics can be freely determined in accordance with the respective conditions. The characteristics of the apparatus according to the present invention are not limited to the characteristics shown in FIGS. 3A-D.

The function of the first and second signal generators 30 and 50 shown in FIG. 1 can be realized by executing the desired control program in the microcomputer. Moreover, an apparatus with this type of construction lies within the scope of the present invention.

Figure 4:
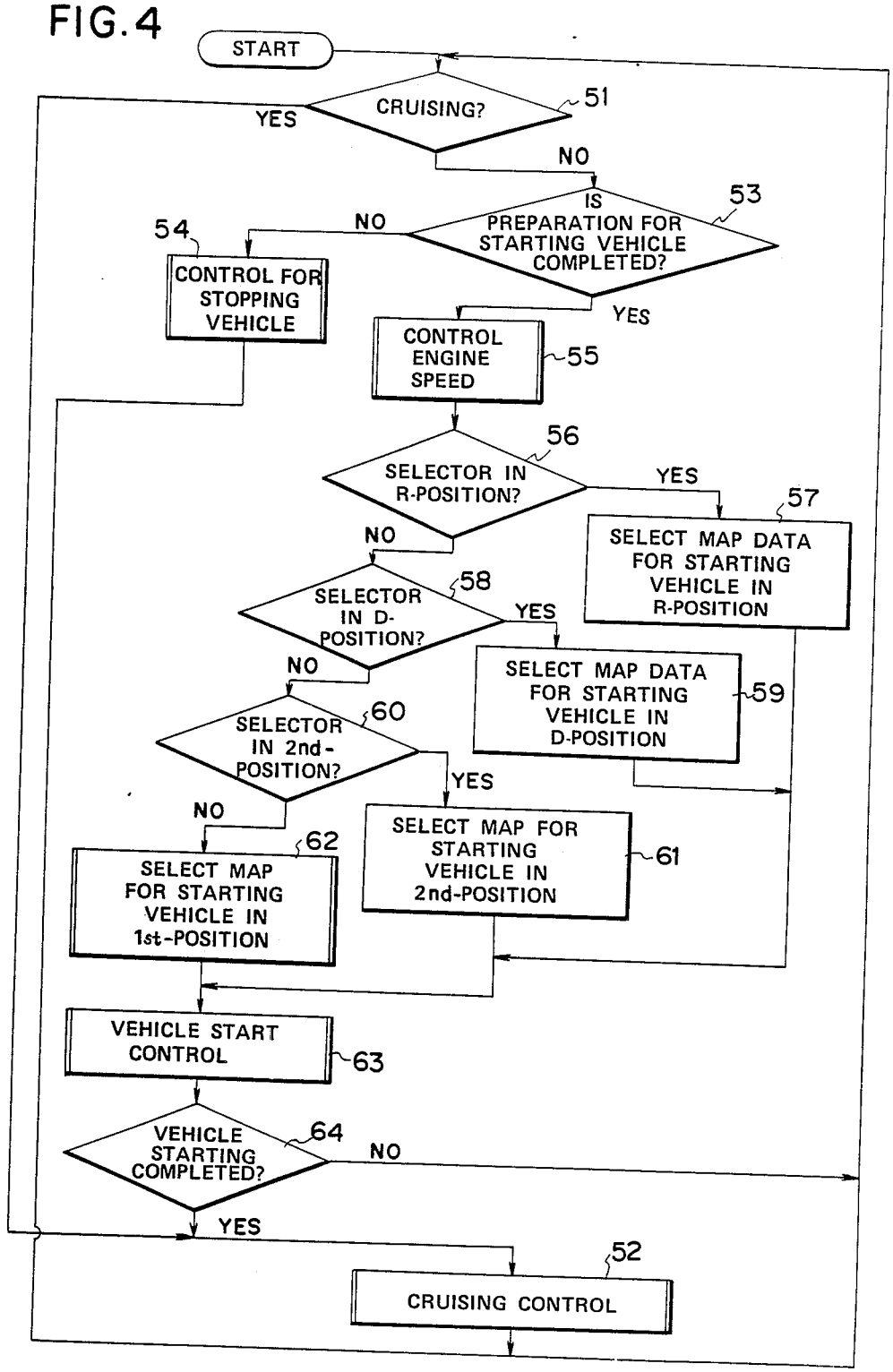
FIG. 4 is a flowchart showing an example of a control program executed by a microcomputer in the case where the device shown in FIG. 1 is to be realized by the use of the microcomputer.

FIG. 4 is a flowchart showing an example of a control program for vehicles adapted to carry out the same function as those of the first and second signal generators 30 and 50 shown in FIG. 1.

The flowchart in FIG. 4 will be described in the following. In step 51, it is discriminated by the vehicle speed signal V whether or not the vehicle is in the course of moving. If the result of this discrimination is YES, the operation moves to step 52 wherein a cruising control operation is carried out which is necessary for the cruising of the vehicle such as the control of, for example, the gear changing operation as carried out in the controller 9 shown in FIG. 1. The operation then moves back to step 51.

If the result of the discrimination in step 51 is NO, the operation moves to step 53 wherein it is discriminated whether the preparation for the starting of the vehicle has been completed, and if the result of this discrimination is NO, the procedure moves to step 54 wherein a control for stopping the vehicle is carried out. The operation then moves back to step 51.

If the result of the discrimination in step 53 is YES, the operation proceeds to step 55 wherein the speed of the internal combustion engine 3 is controlled in accordance with the amount of operation of the accelerator pedal 13. After this, the operation moves to step 56 wherein it is discriminated whether or not the selector 10 is in the reverse (R) position. If the position of the selector 10 is in the reverse position, the procedure moves to step 57 in which map data for starting the vehicle at the time the selector 10 is in the reverse (R) position is selected. If the result of the discrimination in step 56 is NO, the operation proceeds to step 58 wherein it is discriminated whether the selector 10 is in the drive (D) position. If the result of the discrimination in step 58 is YES, the operation proceeds to step 59 wherein map data for starting the vehicle at the time the selector 10 is in the drive (D) position is selected. If the result of the discrimination in step 58 is NO, the operation proceeds to step 60 wherein it is discriminated whether the position of the selector 10 is in the second (2nd) position and if the result is YES, the operation proceeds to step 61 wherein map data for starting the vehicle at the time the selector 10 is in the second (2nd) position is selected. Since the selector 10 is in the first (1st) position if the result of the discrimination in step 60 is NO, the procedure moves to step 62 wherein map data for starting the vehicle at the time the selector 10 is in the first (1st) position is selected.

After map data required for starting the vehicle in an operating position of the selector 10 at that time has been selected as forementioned, the operation moves to step 63 wherein the control for starting the vehicle is carried out in accordance with the selected map data for starting the vehicle; i.e. an operation for starting the vehicle including the engaging operation of the clutch 4 is carried out. The operation then moves to step 64 wherein it is determined whether the starting operation of the vehicle has been completed or not. If the starting operation of the vehicle has not been completed, the operation moves back to step 51 while alternatively, if the starting of the vehicle has been completed, the procedure moves on to step 52 where the control of the cruising of the vehicle is started.

Accordingly, in the present invention, the engaging operation of the clutch connected to the transmission device equipped with a selector at the time of the starting of the vehicle is carried out in an engaging operation mode corresponding to the operating position of the selector, thus making possible an automatic engaging operation of the clutch reflecting the intentions of the operator and a smooth and moreover safe starting of the vehicle.

We claim:

1. An apparatus for controlling a clutch at the time of starting a vehicle powered by an internal combustion engine, wherein said clutch is located between said internal combustion engine and a transmission device whose gear shift position is determined in accordance with an operating position of a selector, said apparatus comprising:
    means for producing a position signal indicating the operating position selected by said selector;
    first means for generating a command signal for commanding the beginning of the starting of said vehicle;
    second means responsive to said position signal and said command signal for selecting one of a plurality of clutch engaging patterns in accordance with said position signal and for generating in accordance with said selected clutch engaging pattern a control signal for engaging said clutch so as to provide a predetermined reduction of a slip rate of said clutch with the passage of time after the generation of said command signal; and,
    actuating means responsive to said control signal for actuating said clutch at an engaging speed corresponding to said predetermined slip rate reduction.

2. An apparatus as claimed in claim 1 wherein said first means comprises discrimination means for discriminating whether or not prescribed conditions required for performing a fully engaging operation of the clutch are satisfied and for producing the command signal when the prescribed conditions are satisfied.

3. An apparatus as claimed in claim 2 wherein said discrimination means comprises means for performing said discrimination in response to at least a first signal showing the amount of operation of an accelerator pedal.

4. An apparatus as claimed in claim 3 wherein said second means comprises means for generating as the control signal a signal for engaging the clutch by gradually reducing the slip rate of the clutch with the passage of time in response to the application of the command signal.

5. An apparatus as claimed in claim 2 wherein said second means comprises means for generating as the control signal a signal for engaging the clutch by reducing the slip rate of the clutch with the passage of time in response to the application of the command signal.

6. An apparatus as claimed in claim 1 wherein said second means comprises means for generating as the control signal a signal for engaging the clutch by gradually reducing the slip rate of the clutch with the passage of time in response to the application of the command signal.

7. An apparatus as claimed in claim 1 wherein said second means has means for producing a plurality of target slip rate signals in response to the application of said command signal, each of the target slip rate signals being indicative of a target slip rate which decreases with the passage of time in accordance with a different characteristic, means for selecting one of the target slip rate signals in accordance with said position signal, and generating means for producing as the control signal a signal for controlling said actuating means so as to engage the clutch in accordance with the selected target slip rate signal.

8. An apparatus as claimed in claim 7 wherein said generating means includes a correcting means for correcting the selected target slip rate signal in response to a signal showing the amount of operation of an accelerator pedal.

9. An apparatus as claimed in claim 7 wherein said generating means has means for producing an actual slip rate signal showing the actual slip rate of the clutch, means responsive to the selected target slip rate signal and the actual slip rate signal for producing a difference signal corresponding to the difference between the actual slip rate and the target slip rate at that time, means responsive to the difference signal for setting an actuating speed for actuating the clutch, and means for producing as the control signal a driving signal for actuating said actuating means so as to engage the clutch at the actuating speed in response to the output from said means for setting an actuating speed.

10. An apparatus as claimed in claim 9 further comprises means for cutting off the output of the control signal when the amount of load of the internal combustion engine becomes larger than a predetermined load level.

11. An apparatus as claimed in claim 1, further comprising a speed detector for producing a speed signal indicating the actual speed of the internal combustion engine, an acceleration detector for producing an acceleration signal indicating the actual amount of operation of an accelerator pedal, and a controlling means responsive to the speed signal and the acceleration signal for controlling the speed of the internal combustion engine in such a way that a control mode is changed depending upon a command signal.

12. An apparatus as claimed in claim 11 wherein said controlling means has an actuator for regulating the position of a fuel regulating member of a fuel injection pump associated with the internal combustion engine, and a speed control means responsive to the speed signal and the acceleration signal for controlling the speed of the internal combustion engine in such a way that the speed of the internal combustion engine is controlled in accordance with a maximum-minimum speed governor characteristic when the command signal is produced and the speed of the internal combustion engine is controlled in accordance with an all-speed governor characteristic when the command signal is not produced.

* * * * *